United States Patent
Zeroug et al.

(10) Patent No.: US 10,138,727 B2
(45) Date of Patent: Nov. 27, 2018

(54) ACOUSTIC MULTI-MODALITY INVERSION FOR CEMENT INTEGRITY ANALYSIS

(71) Applicant: SCHLUMBERGER TECHNOLOGY CORPORATION, Sugar Land, TX (US)

(72) Inventors: Smaine Zeroug, Lexington, MA (US); Bikash K. Sinha, Cambridge, MA (US); Sandip Bose, Brookline, MA (US); Jiaqi Yang, Belmont, MA (US); Ting Lei, Cambridge, MA (US); Ram Sunder Kalyanaraman, Vaucresson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 753 days.

(21) Appl. No.: 14/170,427

(22) Filed: Jan. 31, 2014

(65) Prior Publication Data
US 2015/0219780 A1  Aug. 6, 2015

(51) Int. Cl.
| | |
|---|---|
| G01V 1/40 | (2006.01) |
| E21B 49/00 | (2006.01) |
| E21B 47/00 | (2012.01) |
| E21B 47/14 | (2006.01) |
| G01V 1/50 | (2006.01) |

(52) U.S. Cl.
CPC ........ *E21B 49/003* (2013.01); *E21B 47/0005* (2013.01); *E21B 47/14* (2013.01); *G01V 1/50* (2013.01)

(58) Field of Classification Search
CPC ... G01V 1/50; G01V 1/46; G01V 1/48; G01V 1/52; G01V 3/34; B06B 1/0688; G06K 9/0063; G01N 2291/02491; G01N 2291/0421; G01N 2291/0422; G01N 2291/2636; G01N 29/07; G01N 29/11; G01N 29/48; G01N 29/52
See application file for complete search history.

(56) References Cited

U.S. PATENT DOCUMENTS

| | | | |
|---|---|---|---|
| 4,896,303 A | 1/1990 | Leslie et al. | |
| 5,036,496 A | 7/1991 | Rutledge | |
| 5,216,638 A | 6/1993 | Wright | |
| 5,544,127 A * | 8/1996 | Winkler | G01V 1/52 |
| | | | 181/104 |
| 5,859,811 A | 1/1999 | Miller et al. | |

(Continued)

OTHER PUBLICATIONS

International Search Report and Written Opinion from corresponding PCT Application No. PCT/US2015/012610 dated Apr. 2, 2015, 14 pages.

(Continued)

*Primary Examiner* — Elias Desta

(57) ABSTRACT

Apparatus and method for characterizing a barrier installed in a borehole traversing a formation including locating an acoustic tool with a receiver and a transmitter at a location in the borehole, activating the acoustic tool to form acoustic waveforms, wherein the receiver records the acoustic waveforms, and processing the waveforms to identify barrier parameters as a function of azimuth and depth along the borehole, wherein the waveforms comprise at least two of sonic signals, ultrasonic pulse-echo signals, and ultrasonic pitch-catch signals.

24 Claims, 12 Drawing Sheets

(56) References Cited

U.S. PATENT DOCUMENTS

| | | |
|---|---|---|
| 7,681,450 B2 | 3/2010 | Bolshakov et al. |
| 2007/0206439 A1 | 9/2007 | Barolak et al. |
| 2008/0112262 A1 | 5/2008 | Tang et al. |
| 2012/0176862 A1* | 7/2012 | D'Angelo .............. E21B 47/101 367/35 |
| 2015/0198032 A1 | 7/2015 | Sinha et al. |
| 2015/0198732 A1 | 7/2015 | Zeroug et al. |
| 2015/0378040 A1* | 12/2015 | Mandal .................... G01V 1/44 367/35 |

OTHER PUBLICATIONS

Anonymous, "Isolating Potential Flow Zones During Well Construction," API Recommended Practice 65—Part 2 First Edition, May 2010: pp. 1-104.

Dempster, "A Generalization of Bayesian Inference," J. R. Stat. Soc. B., 1968, vol. 30: pp. 205-247.

Hayman et al., "High-Resolution Cementation and Corrosion Imaging by Ultrasound," SPWLA 32nd Annual Logging Symposium, Jun. 1991: pp. 1-25.

Hayman et al., "Quantitative Corrosion Evaluation in Wells Using a Multi-Function Ultrasonic Imager," IEEE Ultrasonics Symposium, 1995: pp. 1115-1120.

Sinha et al., "Geophysical Prospecting Using Sonics and Ultrasonics," Wiley Encyclopedia of Electrical and Electronics Engineering, Dec. 1999: pp. 340-.

Van Kuijk et al., "IPTC 10546: A Novel Ultrasonic Cased-Hole Imager for Enhanced Cement Evaluation," International Petroleum Technology Conference, 2005: pp. 1-14.

Zeroug, "Forward Modeling for Ultrasonic Leaky Lamb-Wave Based Imaging Through a Highly Contrasting Steel Cylindrical Layer," IEEE Ultrasonics Symposium, 2004: pp. 672-675.

\* cited by examiner

ACOUSTIC MULTI-MODALITY INVERSION FOR CEMENT INTEGRITY ANALYSIS

FIELD

Embodiments herein relate to characterizing cement integrity using acoustic information collected using multiple acoustic measurements carried out at multiple frequency ranges.

INTRODUCTION

Effective diagnosis of well zonal isolation has become critical with more rigorous government regulations. These regulations call for oil and gas operators to deliver and maintain wells with pressure seals that prevent uncontrolled flow of subterranean formation fluids such as natural gas, saline and hydrocarbon fluids to leak into the atmosphere or into an underground formation. The diagnosis should be performed following a cementation job or during the life of a well or at the end of its life before plug and abandonment.

Acoustic measurements are widely used to provide a diagnosis of the condition of the placed cement. However, inversion and interpretation methods for these measurements suffer from many limitations that impede their effectiveness to render an unambiguous diagnosis on what fills the annular space between casing and formation in a single string case or between primary casing and secondary casing and secondary casing and formation in a double string situation. Acoustics are affected by several mechanisms ranging from structural (i.e., tool position within the casing, geometry of the casing within the hole, geometry of the hole, etc.) to intrinsic material parameters (the bulk properties of annular material, casing, formation, borehole fluid) as well as to interfacial conditions (the bond of the cement to casing and to formation).

When parameterized accordingly, these conditions yield a large number of previously unknown information such as cement wave velocities and bonding parameters that require data from multiple measurements with ideally orthogonal sensitivities to these unknowns (otherwise the multiplicity of data adds redundant information helpful for robustness but otherwise of limited use in the inversion for all the pertinent unknowns).

For completeness, we start by describing the current measurements, briefly covering the way they are used and listing their limitations when each is used separately.

Current Acoustic Measurements, their Advantages and Limitations

There are two types of acoustic measurements we are concerned with:

1—Ultrasonic (high-frequency) measurements as implemented in ISOLATION SCANNER™, a measurement tool commercially available from the Schlumberger Technology Corporation of Sugar Land, Tex. The signal frequency ranges from 80 kHz to several hundred kHz. Two types of configurations are considered (see FIG. 1):

a. Pulse-echo with a single trans-receiver that pulses an acoustic beam at normal incidence to the casing inner wall and receives the return echo energy. This measurement technique is embedded in the USI™ (Ultrasonic Imager) but also in the ISOLATIONSCANNER™. At normal incidence and in thin steel casings that are 15 mm-thick and thinner, a casing thickness mode is excited in the typical frequency range of 200-500 kHz and leads to a resonant response for the received waveform. This casing mode corresponds to the casing $S_1$ Lamb mode. The inversion technique estimates the decaying resonance and associates it with an acoustic impedance (equal to the product of compressional wavespeed and density) (Zcmt) for the cement. In thicker casing (>15 mm), the received signal is seen to be made of temporal isolated echoes arising from multiple resolvable reflections occurring at the casing walls. Processing of the amplitudes of these echoes also leads to an estimation of the cement acoustic impedance Zcmt.

The primary limitation of the pulse-echo technique is its inability to probe deeper than the immediate casing-cement region. The inversion accuracy is strongly dependent on the acoustic impedance of the borehole fluid within which the tool is immersed. Further, the amplitude decay is equally sensitive to the cement impedance as it is to its bond with the casing: a disbond reflecting a physical gap at the casing-cement interface reduces the inverted cement impedance to being close to that of fluid resulting in ambiguity as to whether there is cement or fluid behind the casing.

b. Pitch-catch with separate transmitters and receivers. One embodiment of this technique is implemented in the flexural wave imager on the ISOLATION SCANNER™ Depending on the orientation angle of the transmitting and receiving transducers, one of more than one Lamb modes of the casing can be excited and detected. In the ISOLATION-SCANNER™, one transmitter and two receivers are utilized. Further, the transducers angles and separation are optimized to excite and detect the casing flexural mode which is identified as the lowest antisymmetric Lamb mode ($A_0$).

Two attributes of the received signals are used to invert for the cement properties: (i) the peak amplitude associated with the echo propagating in the casing as it decays from the first receiver to the second—this is referred to as the flexural attenuation (Flex_ATT) and is used to discriminate cement from liquid and gas, and (ii) the reflection echo at the cement-formation interface, referred to as the third-interface echo or TIE; where when it is present in the data, its transit time can be used to invert for the cement wavespeed. Depending on the cement properties, the TIE can be single or multiples. t is seen to be a single shear-shear (SS) reflection echo for a cement with Vp larger than roughly 2800 m/s (the cement is said to be acoustically fast; non-mud-contaminated class H cements belong to this category). The TIE is seen to be made of two or three echoes representing compressional-compressional (PP), converted PS/SP, and SS reflections for a cement with Vp less than roughly 2500 m/s (the cement is said to be acoustically slow; Light-weight and foam cements belong to this category). Inversion of these echoes yields either Vp or Vs or both depending on the echoes tracked and available for inversion.

One limitation of the use of Flex_ATT is the fact its dependence on cement acoustic impedance is double-valued: meaning low Zcmt (such as for lightweight cement) and high Zcmt (such as for class H cement) may have the same value of Flex_ATT. In the inversion for the ISOLATION-SCANNER™ the pulse-echo inverted acoustic impedance is used to attempt to remove this ambiguity. However, given the problem with high sensitivity to mud impedance of the pulse-echo data inversion, as highlighted above, this integration is not always successful and has been seen as sometimes more of a contamination of the more robust Flex_ATT data.

A second limitation pertains to the fact that the TIE is not always present in the data for reasons that are believed to be due with either high elastic wave attenuation in the cement, large roughness of the cement-formation interface, or an elastic wave impedance match at the cement-formation interface.

2—Sonic (low-frequency) measurements as implemented in the SONICSCANNER™. The signal frequency ranges from a few hundreds of Hz to 20 kHz. In the Record-All-Data acquisition mode of the SONIC SCANNER™, the measurement is very rich in data as multiple borehole modes are excited and detected using a multiplicity of transmitters and individual recordings of receivers in an axial and azimuthal array. These include the monopole mode that can be excited both at low and high frequencies and with far and near (with respect to the receiver array) monopole sources, and the dipole mode that can be excited at two orthogonal directions yielding cross-dipole excitation.

The near monopole excitation provides also the Cement-Bond-Log (CBL) signal as well as the Variable-Density-Log (VDL) data. These are measurements available with older-generation cement bond log tools. Typically the amplitude of the early-arriving part of the signal in the CBL data is correlated to the cement presence in the annulus with the signal being high whenever there is a lack of cement or a lack of good cement bond to the casing. The VDL data displayed indicates whether formations arrivals are present or not. Their presence indicate coupling to the formation through cement that is attached to the formation, and vice-versa for their absence.

The sonic measurement has several limitations including a lack of azimuthal resolution, low axial resolution (of the order of 1 m), and sensitivity to several mechanisms over the region it probes such as casing eccentering, fluid channel, defects in the cement sheath, disbonding at either or both interfaces and covering the whole or a part of the azimuthal range, etc.

FIG. 1 is a schematic drawing of several views of ISOLATION SCANNER™ showing the pitch-catch flexural wave measurement implemented with one transmitter and two receivers, and the pulse-echo measurement with a trans-receiver located at 180 degrees from the pitch-catch part. Also shown are idealized top and side views of the cased hole environment in an oilfield well comprised of, from inward to outward, the borehole fluid, the steel casing (very dark gray), a cemented annulus (dark gray), and surrounding rock formation (light gray). The sketch shows schematics for the ultrasonic pulse-echo (center) and pitch-catch (right) measurement techniques. The ultrasonic transducers harbored on a tool insonify the (highly-contrasting) steel casing to probe and image the content of the cemented annulus behind the casing.

FIG. 2 is a schematic drawing of a SONIC SCANNER™ tool showing multiple transmitters (monopole and cross-dipole) and a receiver section housing an array of 13 stations with 8 azimuthal receivers at each station as well as a schematic depicting the measurement in a cemented and cased well.

FIGURES

SUMMARY

Figure 1:
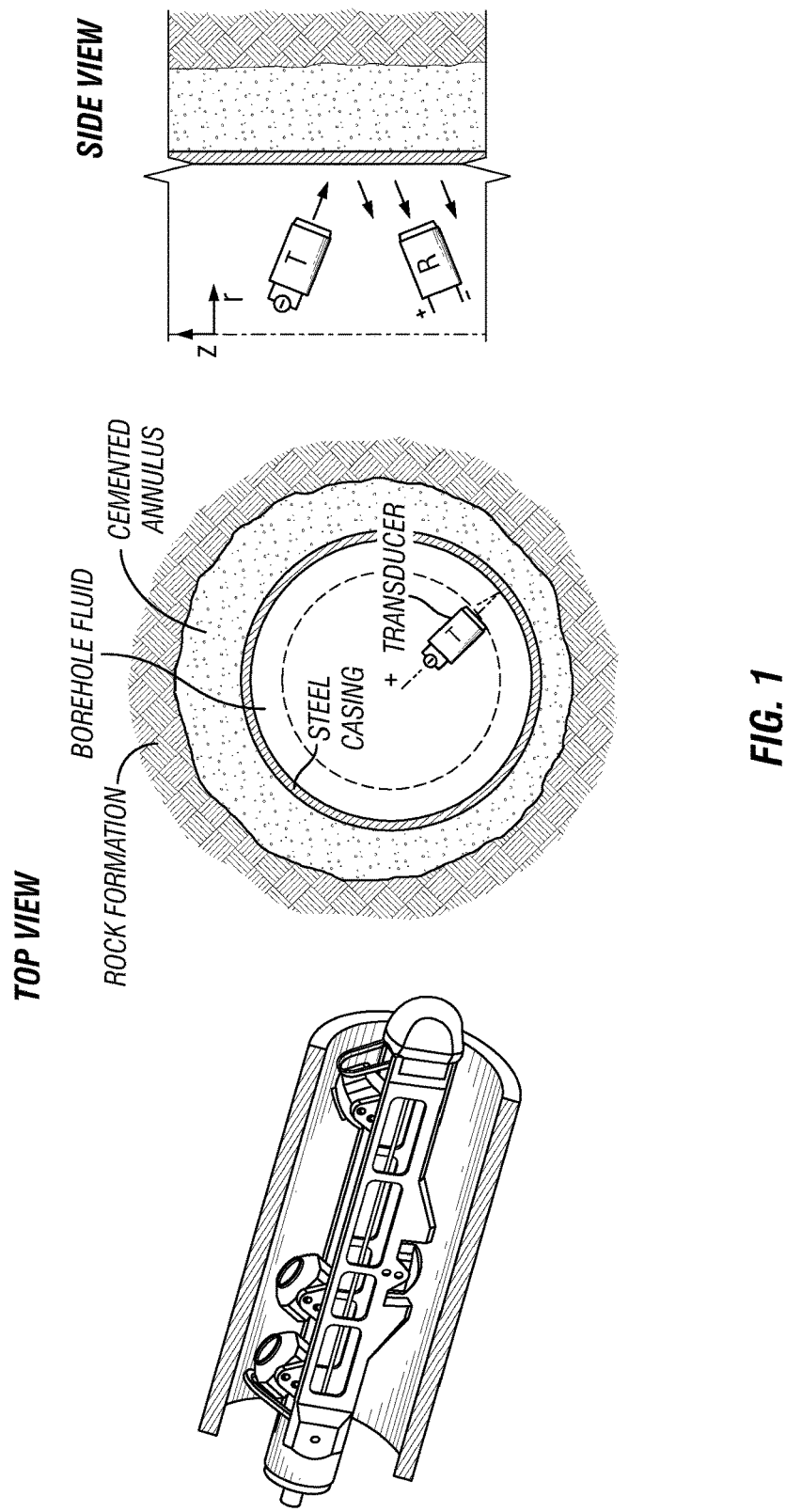
FIG. 1 is a composite of sectional views of an ISOLATIONSCANNER™ tool and idealized sketches of the pulse-echo (center) and pitch-catch (right) measurements implemented on the tool.
Figure 2:
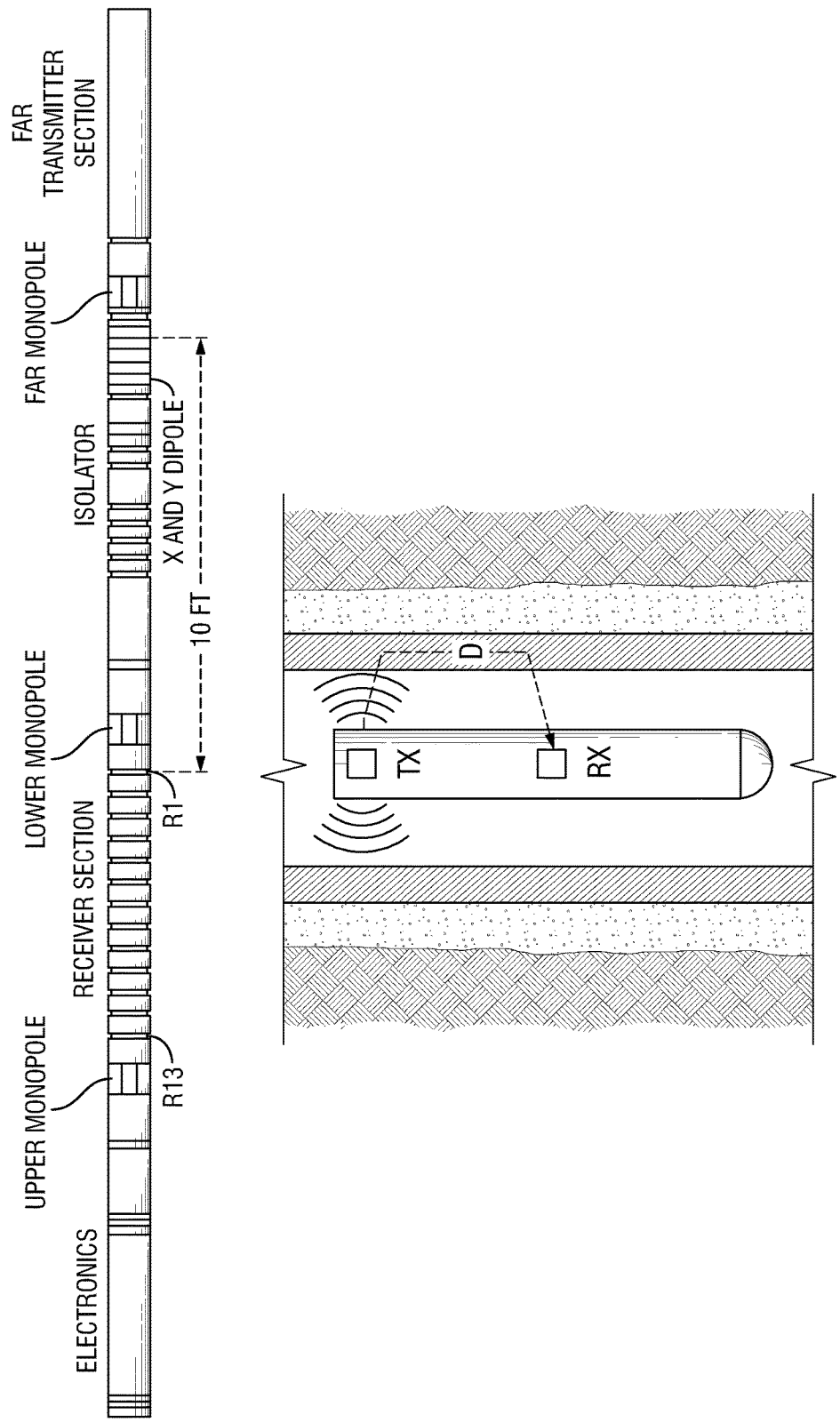
FIG. 2 is a sectional view of a Sonic Scanner™ tool and idealized sketch of the sonic measurement implemented on the tool.

Embodiments herein relate to an apparatus and methods for characterizing a barrier installed in a borehole traversing a formation including locating an acoustic tool with a receiver and a transmitter at a location in the borehole, activating the acoustic tool to form acoustic waveforms, wherein the receiver records the acoustic waveforms, and processing the waveforms to obtain to identify barrier parameters as a function of azimuth and depth along the borehole, wherein the waveforms comprise at least two of sonic signals, ultrasonic pulse-echo signals, and ultrasonic pitch-catch signals.

DETAILED DESCRIPTION

The above-mentioned limitations are particularly acute whenever a single measurement modality is employed to invert for the state of the annulus content. The limitations are compounded in configurations where the number of unknowns increases such as the case where more than one casing is present between the borehole and formation. These limitations are alleviated as the modalities are jointly used in the inversion.

Herein we describe a comprehensive inversion that leverages the strengths of each of the acoustic modalities used for cement evaluation in a complementary way. By acoustic modalities, we mean current and additional measurements that can be implemented as a next-generation cement evaluation tool for Wireline logging as well as via other deployment means such as Logging While Drilling on drilling strings or via coiled-tubing. The result is a much less ambiguous diagnosis of the content of the annulus and whether it provides hydraulic isolation.

Herein we also describe an integrated inversion for the measurements that are available in the ISOLATIONSCANNER™ and SONICSCANNER™ as well as extensions to these embodiments that are believed to provide further robustness to the multi-modality integrated inversion. The end result is an unambiguous interpretation of the properties of the material that fills the annular space of interest.

The Unknowns and Parameters in the Inversion

Evaluating cement evaluation means providing qualitative and quantitative assessment of a number of questions and unknowns. As a practical matter, the general goal is to access the integrity of the barrier encompassing a wellbore including the surfaces and material of the casing, the cement or resin or other rigid sealing material between the casing and the formation, and the formation. Some wellbores may have multiple concentric layers of casing, cement, casing, cement, etc., that form the barrier. Sometimes, fill, cuttings, formation pieces, proppant, sand or other residue may be part of the barrier. In some embodiments, residual drilling or well services fluid may be part of the barrier. In some embodiments, portions of the material may be missing, cracked, deformed or not solid.

1—Annular fill—is the annular space filled with a solid or a liquid?
   If the annular fill is solid, what are its mechanical properties as reflected in the acoustic wavespeeds (compressional Vp and shear Vs) and density ρ? While we use the term acoustics, we realize that as energy propagates in the casing, cement, and formation, it does so as per the elastic wave propagation rules where both compressional and shear waves are involved.
2—What are the azimuthal (indexed by variable φ) and axial (z) distributions of the cement?
   What are Vp (φ,z) and Vs(φ,z)? Are these values lower in certain azimuthal sections indicating cement contamination by mud as has been observed from field data or perhaps indicating lack of a solid material in certain channels for which Vs(φ,z) is nearly zero?
3—Is the solid well-bonded to casing or is it detached to create a gap or microannulus that can allow fluid channeling? A parameterization of the bond is described by a compliance model that assigns variables $\eta_{N2}$ and $\eta_{T2}$ to the normal and tangential bond conditions as probed acoustically. The compliance model is for bonds in a cemented, cased well. A subscript 2 is used to denote the bond at the second interface in recognition of the well-established semantic that assign the third-interface reflection echo to the cement-formation interface, and hence the casing-cement interface is referred to as the second interface. There are in principle two tangential directions, axially and azimuthally and hence there should be two tangential compliance parameters. For the sake of simplicity we shall use only one and associate it with probing along the axial wave propagation whether in the ultrasonic Lamb mode case or the sonic case.
4—Is the solid well bonded to formation or is it detached to create a gap or microannulus that can allow fluid channeling? Similarly to the case 3—above, we assign compliance variables $\eta_{N3}$ and $\eta_{T3}$ to this bond.
5—Is the solid cement cracked or featuring the existence of fluid-filled voids? And if so, are these cracks or voids connected and extending across axial sections to allow for fluid channeling between zones? We shall assign variable $M(\phi,z)$ to represent the crack and/or void distributions. From a hydraulic isolation perspective, it is the permeability associated with $M(\phi,z)$ that is of pertinence to the diagnosis. However, acoustics alone cannot provide a quantification of this parameter. Hence, we will try to use a static proxy for it in terms of $M(\phi,z)$.
6—There is an ancillary parameter pertaining to the question of casing eccentering within the hole. Although the casing eccentering, Cas1Ecc, is not a parameter describing the state of the annulus, it is important in the sense that when the casing is estimated to be eccentered, the inference is that the mud may not have been completely displaced and replaced by the cement slurry during the cementing job execution and the expectation is that the cement properties, at that depth location and above it, are likely to have been negatively impacted (e.g., contaminated or featuring a fluid channel).

In summary, evaluating the cement annulus with acoustics means inverting for a number of unknowns that are function of azimuth and borehole axis $(\phi,z)$:
   1—Vp $(\phi,z)$ and Vs$(\phi,z)$; as well as density $\rho(\phi,z)$.
   2—$\eta_{N2}(\phi,z)$ and $\eta_{T2}(\phi,z)$
   3—$\eta_{N3}(\phi,z)$ and $\eta_{T3}(\phi,z)$
   4—$M(\phi,z)$ Inverting for these several variables require the integration of multiple measurements to reduce non-uniqueness and uncertainty. There are additional motivating factors to integrate multiple measurements due principally to the sensitivity of the data and inversion to environmental parameters that may not be known with enough accuracy or they may impede some of the measurements but not all. For example, fluid acoustic impedance $Z_{mud}$ (wavespeed×density) which is needed with high accuracy for inversion of the pulse-echo measurement, is expected not to play a major role in a multi-modality inversion. Further, when the mud is heavy and highly attenuative, ultrasonic measurements may suffer while lower-frequency sonic measurements are much less affected. Additionally, if the casing-cement interface exhibits a microannulus filled with air (aka dry microannulus), ultrasonic probing is undermined and energy remains trapped within the casing with negligible transmission into the cement sheath. In this case, we expect the much-lower frequency sonic measurement to couple to the cement and to provide some sensitivity to this condition.

Measurements Considered

In terms of measurements, we shall consider that the ultrasonic modalities include at least the pulse-echo, the flexural Lamb mode and the extensional Lamb mode. Additional Lamb modes may also be part of the set of data included in the integrated inversion. The sonic measurements modalities considered here comprise the modes that can be excited and detected in the SONICSCANNER™ tool—that is the monopole and the dipole modes, as well as the quadrupole modes that can be detected under casing eccentering. For centered casings, the quarupole modes can also be detected when excited as through modification or addition of a quadrupole transmitter.

Spatial Scale of the Parameters

The scale at which the unknowns defined above can possibly be inverted for depends on the measurement spatial resolution. Pulse-echo has a footprint of roughly 1" (2.5 cm) both azimuthally and axially; pitch-catch with the flexural or extensional mode has a footprint of around 4 to 8" (10 to 20 cm) axially and around 2" (5 cm) azimuthally; where the monopole sonic measurement integrates across all azimuth and with an axial footprint of ~75" (~180 cm). In contrast, the dipole sonic data averages elastic properties in the two opposite quadrants defined by the dipole transmitter firing direction. The axial footprint is dependent on the axial extent of the receiver aperture that can range from approximately 30 in (~76 cm) to 72 in (~180 cm). However, because the tool sampling along the borehole, while being pulled up and describing a helical path (see FIG. 3), is sparse, typically at about 3" or 6" and sometimes larger than that, the pulse-echo and pitch-catch measurements will be considered as probing at a similar spatial scale of roughly 6". The integration, however, between ultrasonic and sonic will require upscaling of the unknowns (parameters) listed above.

Figure 3:
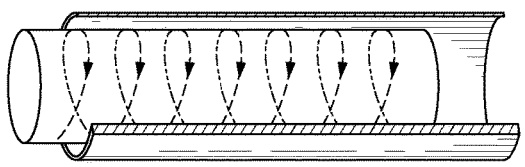
FIG. 3 is a schematic view of a helical path in a wellbore traced by the ISOLATIONSCANNER tool.

FIG. 3 provides a schematic view of a tool path. As the ultrasonic tool such as the ISOLATION SCANNER™ scans the cased hole environment, it describes a helical path with axial sampling of roughly 4" and azimuthal sampling of 2.5, 5 or 10 degrees depending on the application at hand.

In the following description of the integrated inversion, it is appropriate to distinguish between a single string and multiple string configurations. In both configurations, we shall assume that the acoustic tool is placed inside the innermost casing and insonifies acoustic energy onto this casing. A single string means we evaluate one single cemented annulus existing between casing and formation. A multiple string configuration means we evaluate more than one cemented annulus: the primary annulus between primary casing and secondary casing and the secondary annulus between secondary casing and tertiary casing or formation.

Figure 4:
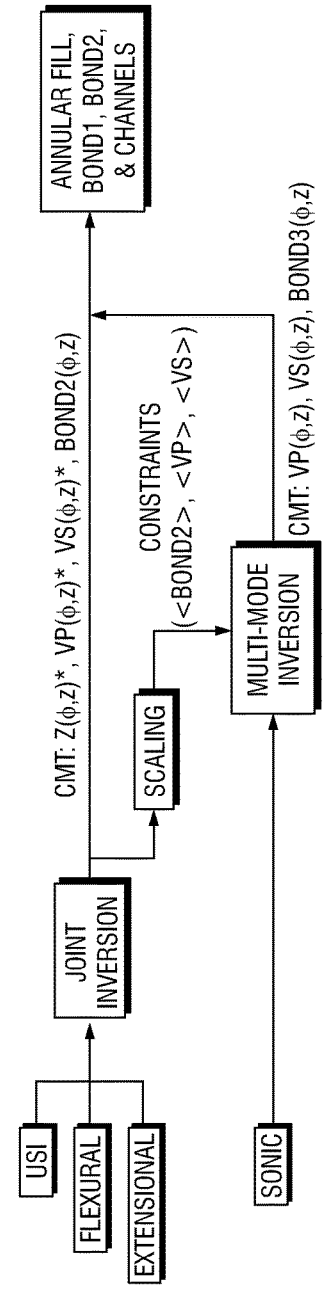
FIG. 4 is a workflow for one embodiment of the integration of high-frequency azimuthally-resolving ultrasonic measurements and low-frequency radially-deep-reading sonic measurements.

Single Casing Configuration:

A possible workflow for the integration of the various measurements is shown in FIG. 4. FIG. 4 provides a workflow for the integration of high-frequency azimuthally-resolving ultrasonic measurements and low-frequency radially-deep-reading sonic measurements. The ultrasonic measurements are made up of the pulse-echo exciting the S1 mode (in non-propagating mode), and the pitch-catch exciting the flexural (A0) and extensional (S0) modes in axially-propagating mode. Their integration in a joint inversion furnish parameters on the cement adjacent to the casing such as the wavespeeds of the cement, Vp* and Vs* (additionally, the acoustic impedance, Z*) as well as the bond parameters at the casing-cement interface—referred to as "bond2," $\eta_{N2}$ and $\eta_{T2}$. These parameters are expressed as functions of the azimuth ($\phi$) and borehole axis (z). They are scaled up to the scale probed by the sonic measurements and used as constraints on the inversion from the sonic multi-mode information (dispersion and other attributes) to invert for the properties of the cement extending all the way to the formation wall and including the bond parameters at the cement-formation interface.

Figure 5:
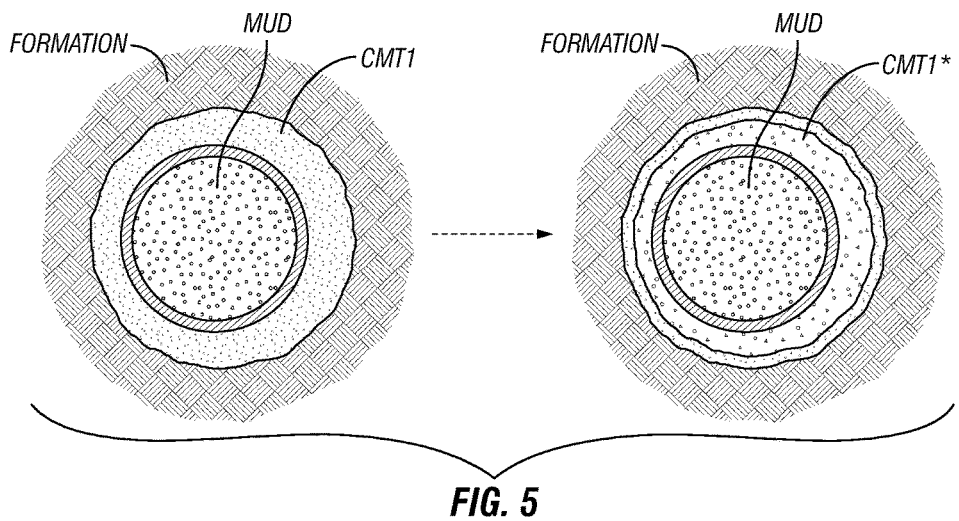
FIG. 5 is a sectional view of a wellbore, casing, formation and other components of an embodiment.

The star (*) on cement parameters Vp*, Vs*, and Z* denotes that they pertain to the region of the cement adjacent to the casing as pictured in the sketch in FIG. 5. This reflects the situation where the ultrasonic data do not exhibit reflection signals from the cement-formation interface and hence the inference cannot be made with certainty on the extent of the cement parameters inverted for. In this case, the sonic data inversion will focus on establishing the extent of these parameters validity. Further, the sonic is used to establish the nature of the bond at the cement-formation.

The cemented annulus is divided into two annuli as shown to the right of FIG. 5 to indicate the region adjacent to the casing that is invertible from the ultrasonic measurements data whenever the latter do not exhibit reflection echoes from the cement-formation interface.

Figure 6:
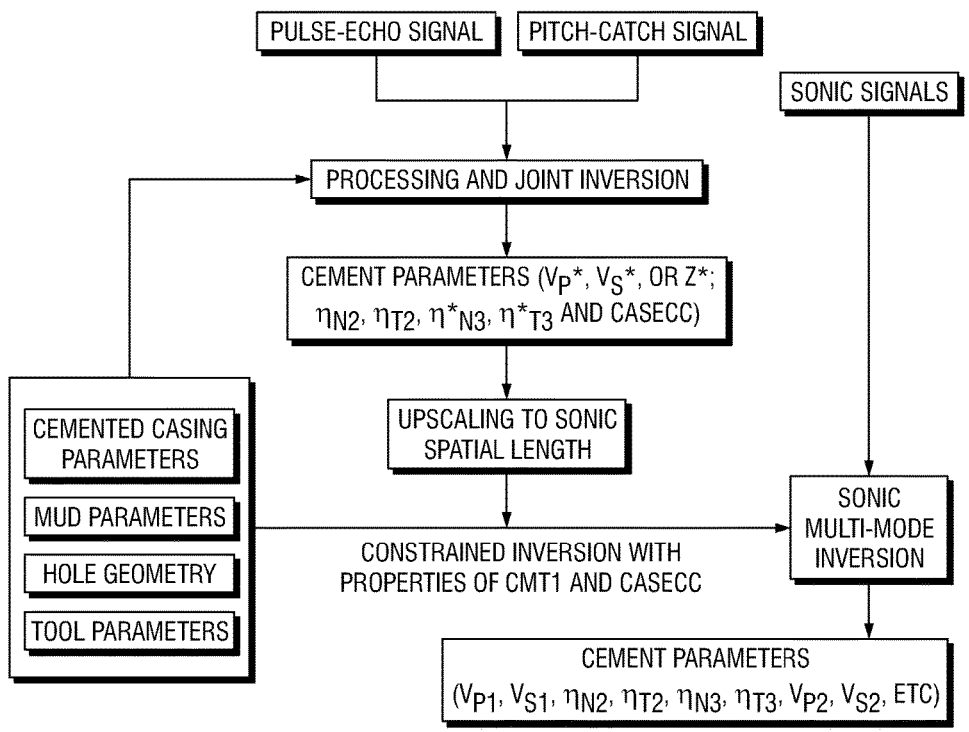
FIG. 6 is a more detailed workflow for an embodiment of the integration of ultrasonic measurements and sonic measurements than shown in FIG. 4.

FIG. 6 provides a more detailed workflow for the integration of ultrasonic measurements and sonic measurements than that shown in FIG. 4. FIG. 6 shows additionally the introduction of input parameters (left box) that may or may not be available. The inversion for the casing eccentering from the ultrasonic data is used as an additional constraint in the inversion of the dispersion-based sonic data. The upscaling of the properties obtained at a spatial scale of roughly 6" from the inversion of the ultrasonic data to a scale ten time larger (roughly of 75") relevant to carrying out the inversion of the sonic data can be performed through various ways. For instance, volume-weighted averaging methods can be used for the wavespeeds whereas surface-weighted averaging can be used for the bond parameters.

The central premise of the joint inversion for the ultrasonic measurements lies on the fact that the different wave modalities excite different particle motions in the steel casing and cement annulus. In the pulse-echo measurement, the particle motion associated with the wave is predominantly normal (or out-of-plane) to the casing-cement interface and hence it is sensitive mostly to the state of the normal bond between casing and cement as well as to the compressional wave property of the cement as expressed through its acoustic impedance (i.e., the product of cement density by its compressional wavespeed).

On the other hand, pitch-catch measurements excite predominantly propagating Lamb modes within the casing whose associated particle motions depend on the frequency range considered (this is known as structural dispersion). For instance, a particular mode can have a predominantly out-of-plane particle motion within the low frequency range of the signal and a predominantly in-plane particle motion, or a balanced out-of-plane and in-plane motion, away from the low frequency range. Further these characteristics could differ for the next Lamb mode that is excited. These frequency dispersion properties are exploited to focus on sensitivities to the specific unknowns described above. For instance, the in-plane motion will be highly sensitive to the presence of a slip or a mild disbond between casing and cement that may not be detected with a modality with an out-of-plane motion. Further the same in-plane motion will also be very sensitive to the presence of a fluid in contact with the casing, hence providing the means to distinguish bonded cement from a fluid.

The rich variety in particle motion associated with the various Lamb modes and their dispersions is exploited in the inversion considered here through various means as described in the section on "inversion approaches" listed below.

Figure 7:
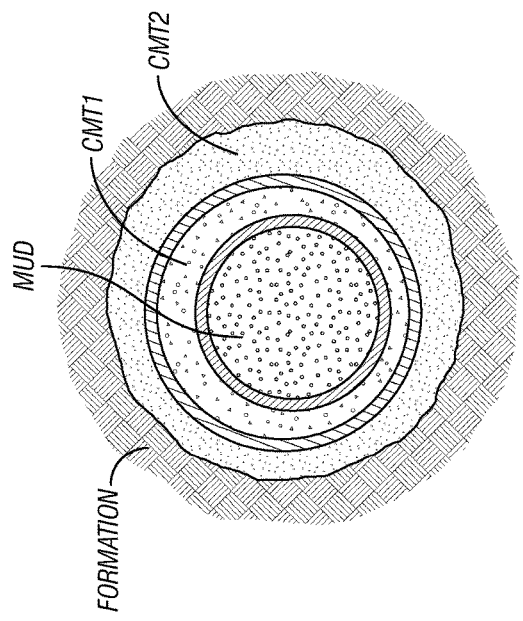
FIG. 7 is a sketch of a double casing case with cement placed between the two casings and between the outer casing and formation.

Double or Multiple Casing Configuration:

FIG. 7 provides a sketch of a double string case with cement placed between the two strings and between the outer string and formation.

Figure 8:
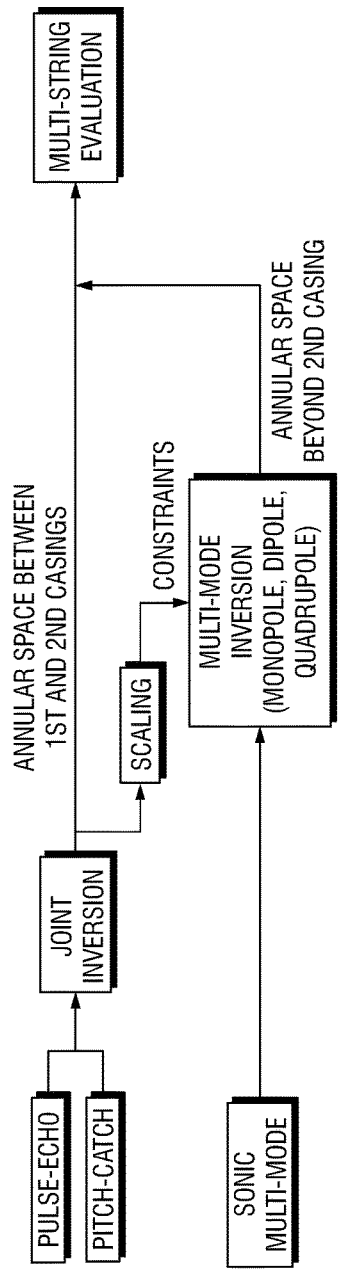
FIG. 8 is a workflow of an embodiment of the integration of ultrasonic measurements and sonic measurements for a double and multiple casings situation.

FIG. 8 is a workflow of an embodiment of the integration of ultrasonic measurements and sonic measurements for a double and multiple strings situation. Analogous to the single-string inversion, the ultrasonic data is utilized to invert for the parameters of cement sheath placed between first and second casings. These inverted parameters are then used as constraints in the inversion for the cement sheath beyond the second casing. Because the inner cement sheath is bordered by a steel casing, the ultrasonic data are expected to exhibit third-interface reflection echoes due to the strong contrast at the cement-steel interface. These data should allow for more accurate inversion of the cement wavespeeds (under the knowledge of the inner and outer casing diameters and thicknesses) as well as the amount of eccentering, if any present, between the inner casing and the second casing.

Inversion Approaches:

The inversion of the various measurements can be based on a several approaches depending on several elements.

Figure 9:
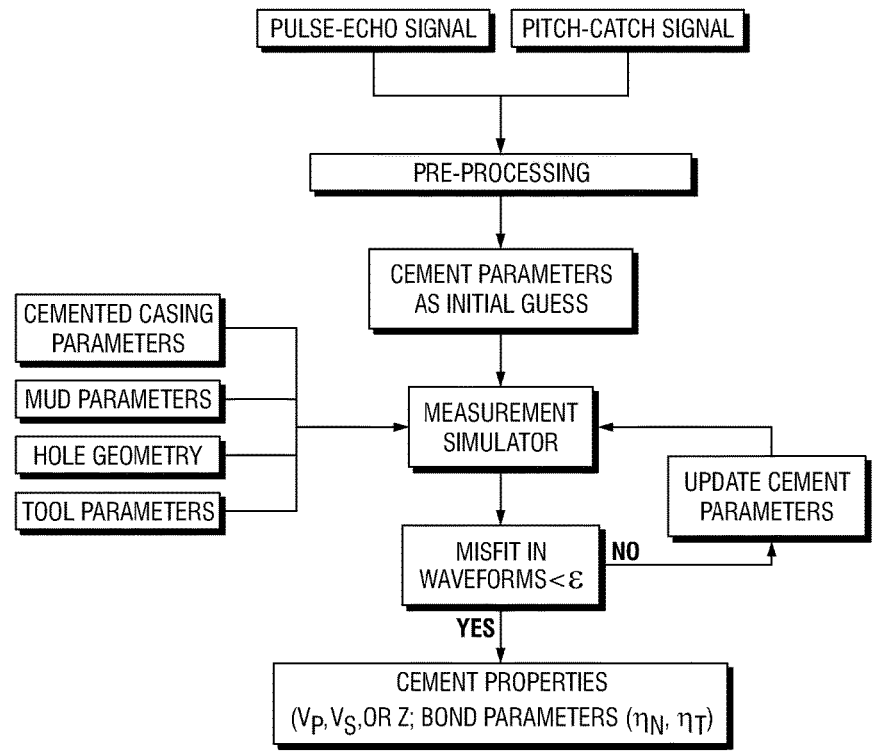
FIG. 9 is a workflow of an embodiment for a waveform-based inversion applied to the ultrasonic pulse-echo and pitch-catch measurements.

(i) The inversion can be based on waveforms. This is possible with the availability of fast and appropriate forward modeling codes. These codes can additionally be calibrated for the ancillary signal electronics system and environmental parameters that are not captured by the model used for the measurement. Because this is possible to a good extent for the ultrasonic measurements, their data inversion can be exercised in this fashion. On the other hand, available sonic codes remain computationally expensive and therefore not amenable to the waveform-based inversion approach. An example of a workflow is shown in FIG. 9 which is workflow of an embodiment for a waveform-based inversion applied to the ultrasonic pulse-echo and pitch-catch measurements. Forward modeling codes are used to generate waveforms that are compared to the measured waveforms and the misfit recorded. The misfit is reduced through iterations on the cement parameters including the state of the bonds. The iterative scheme stops and delivers final quantitative numbers for the cement and bond parameters when the misfit becomes smaller than a prescribed quantity.

Figure 10:
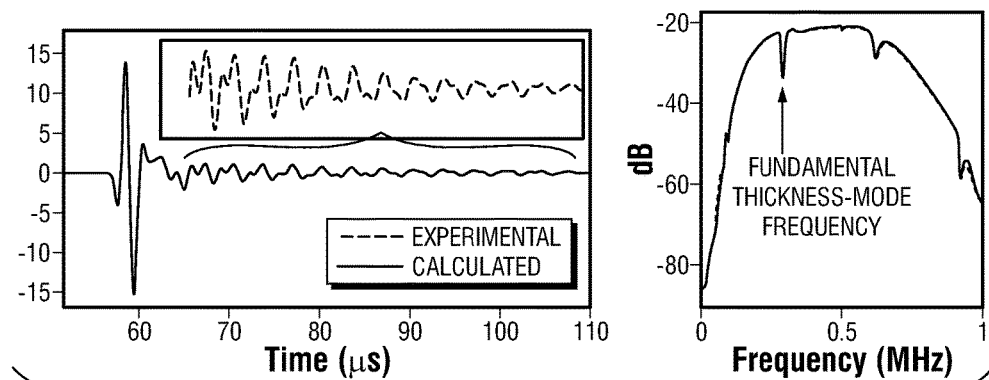
FIG. 10 is plot of calculated and experimental waveforms from the ultrasonic pulse-echo measurement in the time domain (left) and frequency domain (right).

One example for the forward modeling of the pulse-echo measurement is illustrated in FIG. 10 which shows a validation of the results from a modeling code against experimental results. The left plot in FIG. 10 shows a comparison between experimental (dark solid) transducer signal and calculated signal (light solid) from a 3D rigorous model for the cement evaluation pulse-echo measurement for a steel pipe loaded with water on both sides. The inset plot shows an expanded view of the casing resonant response. The plot to the right shows comparison between the associated Fourier spectral amplitudes. The notch around 0.3 MHz is indicated with an arrow—it represents the fundamental casing thickness resonance which is the basis of the measurement. Its position and spectral width are related to the casing thickness and the impedance of the medium in the annulus in contact with the casing.

Figure 11:
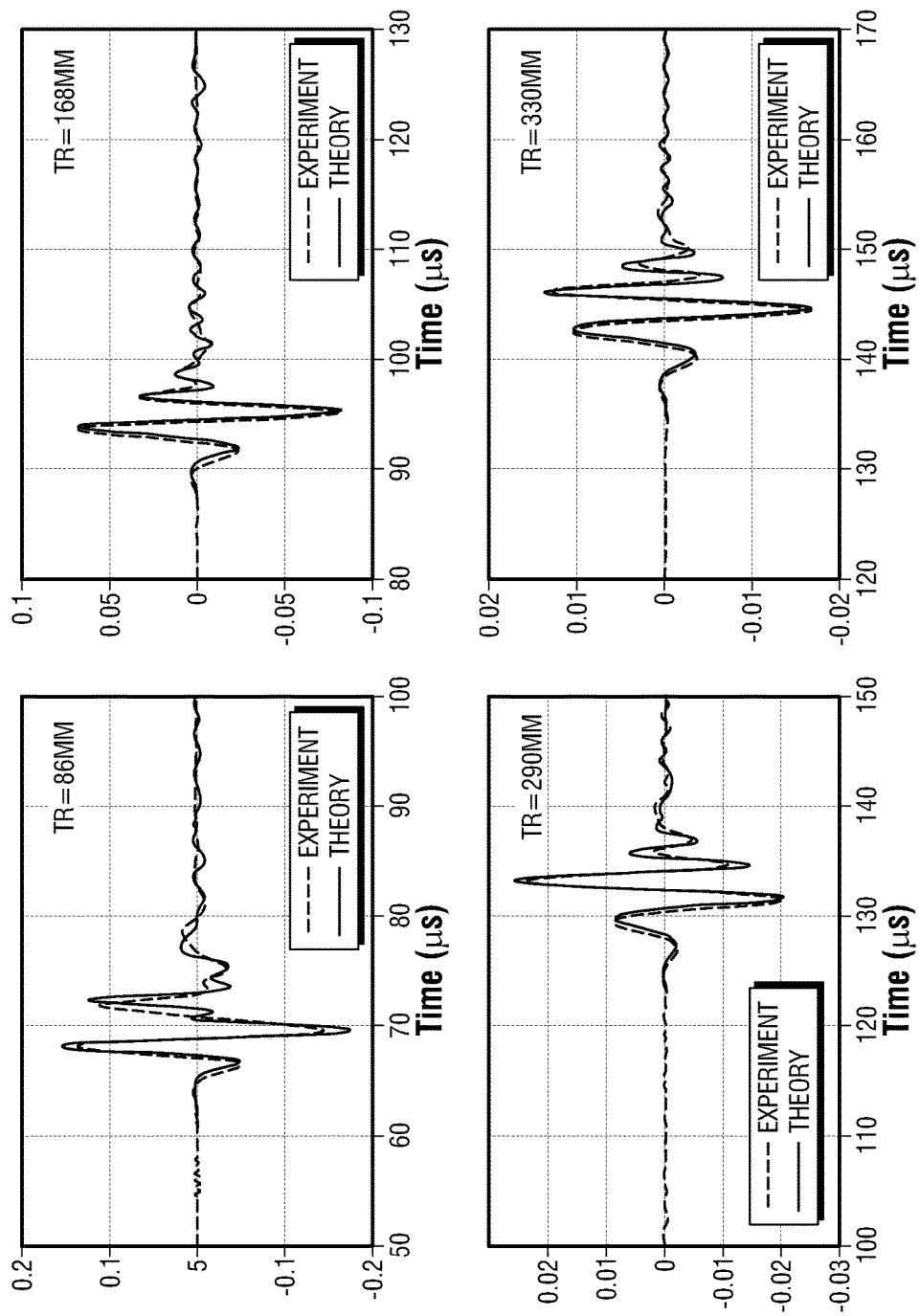
FIG. 11 is a plot of calculated and experimental waveforms from the ultrasonic pitch-catch measurement at four positions of the receiver with respect to the transmitter.

A second example of forward modeling, this time for the pitch-catch measurement, is illustrated in FIG. 11 which shows a validation of the results from a modeling code for this measurement against experimental data. FIG. 11 shows a comparison between model (blue) and experimental data (red) for the first arrival (flexural mode) at a various transmitter-receiver (TR) spacing for the geometry shown to the right in FIG. 1 (for a cylindrical casing surrounded by water on both sides).

Figure 12:
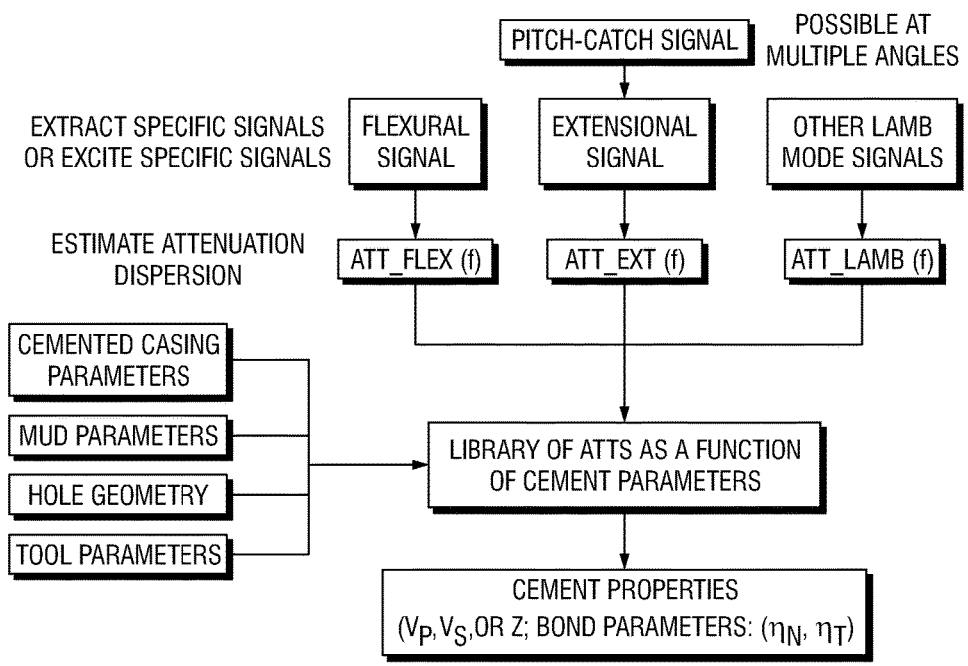
FIG. 12 is a workflow for an embodiment of a Lamb-wave attenuation-dispersion-based inversion applied to the ultrasonic pitch-catch measurement with multiple modalities (exciting multiple Lamb waves separately).

(ii) The inversion can be based on waveform attributes. Amplitude, time of arrival, frequency dispersion of the phase and additionally of the amplitude attenuation are examples of attributes that are first estimated from the signals and then used in the inversion. We expect to use this approach for both ultrasonic and sonic data inversion and the approach is illustrated by the workflow shown in FIG. 12 which is a workflow for attributes-based inversion applied to the ultrasonic pitch-catch measurement with multiple modalities (exciting multiple Lamb waves separately). Pre-processing extract attributes particular to each Lamb mode such as attenuation which can be frequency dependent. These attributes are then compared to a multi-dimensional library of pre-calculated attributes as a function of cement properties. A match up to a specific criterion provides the set of inverted cement parameters.

An attribute library is constructed using modeling results encompassing both the predicted values of such attributes for a range of typical values of the cemented casing parameters, mud parameters and hole and tool geometry as well as the computed sensitivity of the attributes to the various parameters. The measured attributes are then used to best fit the ones in the library using a metric that is dependent on the pre-computed sensitivities. This fitting is done in conjunction with a calibration or normalization operation that reduces the effect of the variability of the individual acquisition such as those arising from transducer response variations or unmodeled environmental effects.

Figure 13:
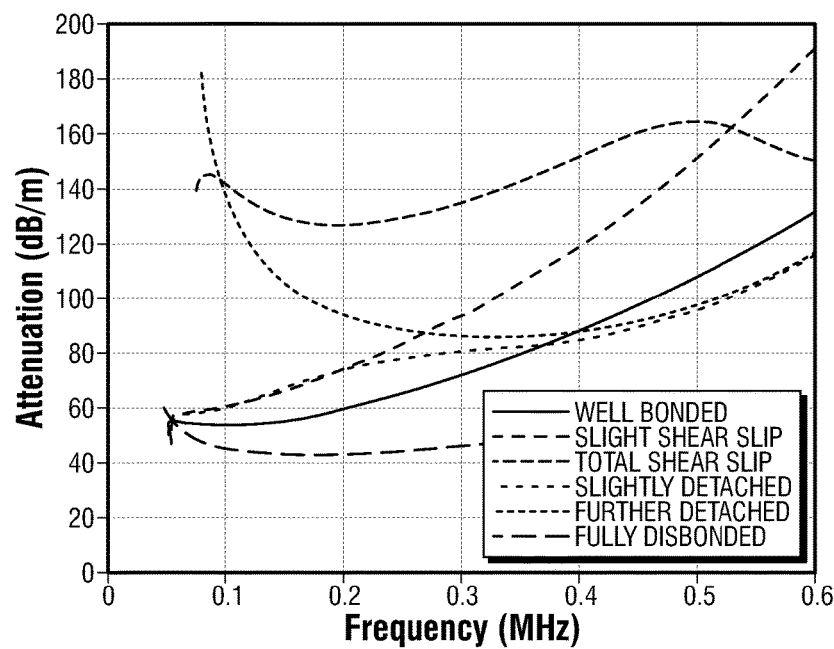
FIG. 13 is a plot of ultrasonic flexural mode attenuation dispersions for different level of cement bonding to a steel plate.

One example of modal attenuation dispersion as an attribute is shown in FIG. 13. FIG. 13 shows the attenuation dispersion curves for the flexural mode in a steel plate cemented on one side with various degrees of bonding of the cement to the steel.

(iii) The inversion can be based on a hybrid approach between waveform-based inversion and attributes-based inversion, each featuring the characteristics detailed above.

Figure 14:
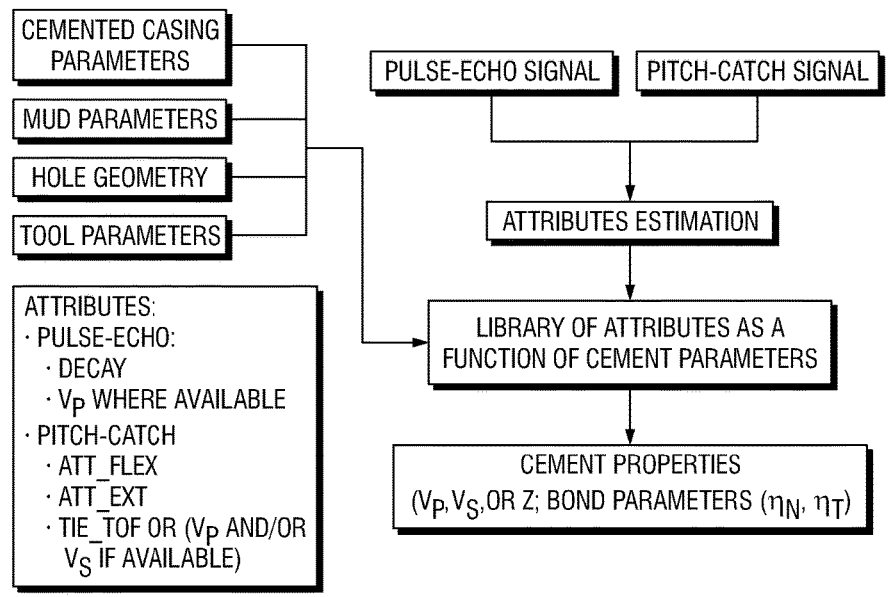
FIG. 14 is a workflow for an embodiment of general attributes-based inversion applied to the ultrasonic pulse-echo and pitch-catch measurement (with potentially more than one modality) and different from modal attenuation attributes.

FIG. 14 is a workflow for attributes-based inversion applied to the ultrasonic pulse-echo and pitch-catch measurement (with potentially more than one modality). Pre-processing extract attributes particular to each measurement such as decay rate for the pulse-echo and attenuation for the flexural and extensional modes. These attributes are then compared to a multi-dimensional library of pre-calculated attributes as a function of cement properties and bond properties. A match up to a specific criterion provides the set of inverted cement parameters.

One Embodiment for the Integrated Inversion of the Ultrasonic Measurements Data

In this section, we shall assume we have access to all possible modalities of the ultrasonic measurements and list one of the envisaged implementations for the integrated inversion.

1. Pulse-echo measurement: whether in thin casings with resonant waveforms or thick casing with a series of isolated echoes, we assume we invert for:
   1.1. A relation $F(\phi,z)|^{pe}$ of the cement acoustic impedance and normal bond parameter at the casing-cement interface: (we shall use the superscript "pe" to denote inverted estimates from the pulse-echo data)

$F(\phi,z)|^{pe}$=function of($Vp(\phi,z)\rho(\phi,z)|^{pe2}$ and $\eta_{N2}(\phi,z)|^{pe}$ This relationship can be expressed in several ways. For instance, the well-known 1D transmission-line model that is used in the current inversion method can be used with the addition of an impedance representing the non-ideal bond between casing and cement and that depends on the compliance parameter $\eta_{N2}$ $(\phi,z)$.

1.2. If third-interface echoes are present in these data, which can be inspected by the presence of galaxy-pattern effects on the impedance map (i.e., $F(\phi,z)|^{pe}$), processing using techniques such as bin processing (U.S. Pat. No. 5,216,638 provides more details and is incorporated by reference herein) may help extract the third-interface echo and yield an estimate for the compressional $Vp(\phi,z)|^{pe2}$ of the cement, by making an assumption on the hole size and/or geometry. In cases of evaluation of a double string, expectations are that if the inner casing is eccentered with respect to the outer string, the third-interface echo should be present in the data unless the cement is highly attenuative due to mud contamination for instance.

Additional details may be found in the following three references.

[1] "Geophysical prospecting using sonics and ultrasonics," B. K. Sinha and S. Zeroug in Wiley Encyclopedia of Electrical and Electronics Engineering, Ed. J. G. Webster, 340-365 (Pub. John Wiley & Sons, 1999).

[2] "Forward modeling for ultrasonic leaky Lamb-wave based imaging through a highly contrasting steel cylindrical layer," In IEEE Ultrasonics Symposium, 2004, 23-27 Aug. 2004, 672-675, Vol. 1.

[3] "Quantitative Corrosion Evaluation in Wells Using a Multi-Function Ultrasonic Imager," in Proc. IEEE Ultrason. Symp., (November 1995), A. Hayman et al.

All three references are incorporated by reference herein.

2. Pitch-catch measurement—flexural and extensional: the data from both modes can potentially provide estimates of the cement properties and casing-cement bond from processing of the casing arrival and, for the flexural mode, the third-interface echo.

2.1. The attenuation can be estimated across two or more receivers. Two attributes can be used: the energy envelope peak decay, A $(\phi,z)$, as well as the attenuation dispersion (i.e., as a function of frequency), $\alpha(f;\phi,z)$:

$A(\phi,z)|^{flex}\&\alpha(f;\phi,z)|^{flex}$ yielding $Vp(\phi,z)|^{flex1};\eta_{T2}(\phi,z)|^{flex2}$ and $\eta_{N2}(\phi,z)|^{flex2}$ and $A(\phi,z)|^{ext}\&\alpha(f;\phi,z)|^{ext}$ yielding $Vp(\phi,z)|^{ext1}$; $\eta_{T2}(\phi,z)|^{ext2}$ and $\eta_{N2}(\phi,z)|^{ext2}$ 2.2. The third-interface echo, where present, provides estimates of the cement wavespeeds under the assumption the hole size is known:

$Vp(\phi,z)|^{flex2}\&Vs(\phi,z)|^{flex2}$

Note only one of the two may be invertible depending on the number of tracked third-interface echoes (TIEs) present in the data.

2.3. The flexural TIE can also provide an estimate of the bond at the cement-formation interface from the reflectivities associated with the various TIEs:

$Rss(\phi,z)|^{flex3}, Rps(\phi,z)|^{flex3}$, and $Rpp(\phi,z)|^{flex3}$ yielding $\eta_{T3}(\phi,z)|^{flex}$ and $\eta_{N3}(\phi,z)|^{flex}$ We here assume the general case where all three TIEs (SS, PS/SP and PP) are present and invertible.

2.4. The flexural TIE can also provide an estimate of the eccentering of the first casing: Cas1Ecc 2.5. If an estimate of the cement wavespeed is derived from processing the early arrivals in the signal, then the TIEs can be used to invert for the annular thickness without requiring making an assumption on the hole or outer casing diameter.

The various estimates are combined judiciously using techniques that are well established in inversion of multi-parameter problems from several data (data fusion, multi-physics inversion etc.). These can be either deterministic or probabilistic. A deterministic approach might consist of fitting the measurements jointly to predictions from a model dependent on the parameters of interest. The best fit then yields the estimated values of these parameters representing states of nature.

The probabilistic approach is based on Bayesian inference and Dempster-Shafer theory of evidence. The Bayesian approach is based on treating all states of nature or parameters as having a probability distribution reflecting a measure of belief in their values. Prior to any measurements, there is a hypothesized starting probability distribution of a state of nature called a priori indicating the starting belief about that state. Such a belief could be based, for example, on a general knowledge of relevant material properties or derived from past experience in similar scenarios. This prior distribution is then used along with measurements pertaining to the parameter to obtain an updated or posterior distribution that indicates the belief about the parameter after the measurements have been taken. The estimate of the parameter could be taken as the maximum of the probability distribution producing the maximum a posteriori estimate, or could be obtained from the mean or median of the posterior distribution. The uncertainty or error bars are similar derived from the width of the distribution around the stated estimate. The probability update is performed using a Bayes rule as shown below and can also be used to combine multiple measurements or estimates for our purposes. We give a brief description of how two different measurements can be combined in such a scheme below.

Let us suppose that we are interested in a state of nature, $\theta$, such as a bonding parameter, and we have two data, D1 and D2, that offer information about $\theta$ and could be obtained from measurements and/or estimates each derived from an inversion. Then we could describe the joint probability distribution of the parameter and data as $p(\theta,D1,D2)$. This could be equivalently described in terms of conditioning on the parameter or the data as follows.

$p(\theta,D_1,D_2)=p(D_1,D_2|\theta)p(\theta)=p(\theta|D_1,D_2)p(D_1,D_2)$

We note that $p(\theta)$ refers to the prior distribution of $\theta$ while $p(\theta|D1,D2)$ is the posterior probability which is conditioned on the data D1 and D2 being observed. Accordingly the Bayes rule provides the recipe for obtaining the posterior distribution:

$$P(\theta|D_1, D_2) = \frac{p(D_1, D_2 | \theta)p(\theta)}{p(D_1, D_2)}$$

Here p(D1,D2|$\theta$) refers to the probability of observing the data given a value of $\theta$ (also called likelihood) and is dependent on measurement and model error and p(D1,D2) refers to the evidence and is obtained by integrating the probability in the numerator over the range of θ.

The details of the integration and the computation of the posterior are dependent on the specific problem. Generally the errors in the data D1 and D2 obtained from multiple measurements can be assumed to be independent and so we can simplify: p(D1,D2|θ)=p(D1|θ) p(D2|θ). Additionally the evidence is used for validating and reconciling the models used in the inversion using the theory of evidence.

One Embodiment for the Integrated Inversion of the Sonic Measurements Data

Sonic measurements may also be inverted in some embodiments. It is envisaged that the dispersions of the various modes detected are to be used to infer the properties of the cement that are not invertible from the ultrasonic measurement as well as the state of the cement-formation interface (see FIG. 9 for an example of a workflow for the ultrasonic measurement data inversion).

Figure 15:
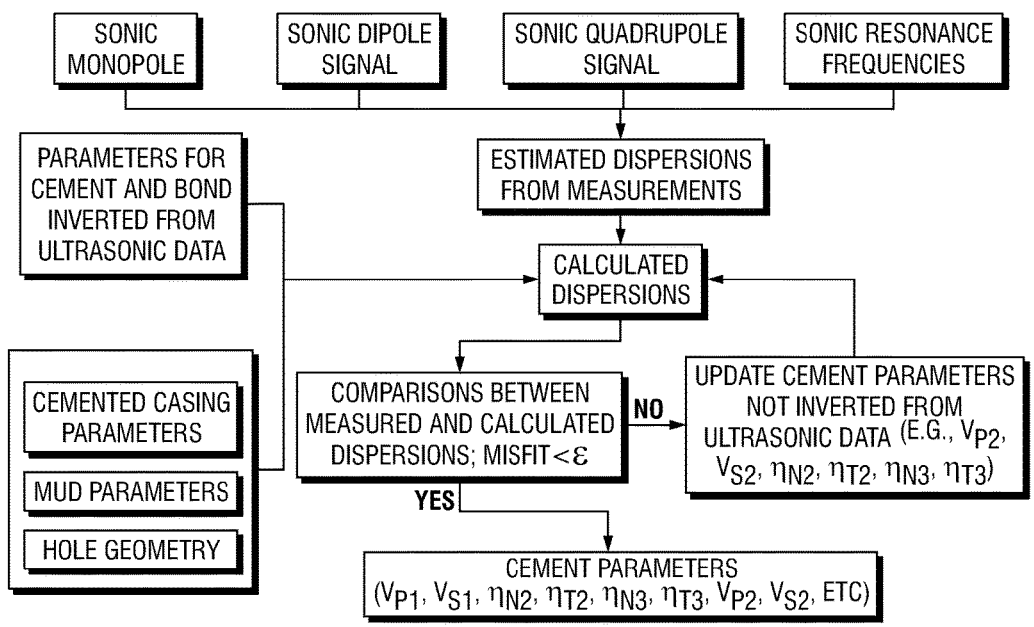
FIG. 15 is a workflow of an embodiment focusing on the sonic dispersion-based inversion with constrained parameters obtained from ultrasonic data inversion as depicted in the integrated ultrasonic and sonic inversions workflows shown in FIGS. 6 & 8.

FIG. 15 is a workflow focusing on the sonic dispersion-based inversion with constrained parameters obtained from ultrasonic data inversion as depicted the integrated ultrasonic and sonic inversions workflows shown in FIGS. 6 & 8. The inversion algorithm minimizes differences between measured and calculated reference dispersions for different values of cement parameters of interest, such as, Vp2, Vs2, $\eta_{N2}$, $\eta_{T2}$, $\eta_{N3}$ and $\eta_{T3}$. A reference dispersion is obtained from a prescribed set of input parameters estimated from the ultrasonic measurements and up-scaled for sonic data analysis. Two different approaches can be used to estimate the cement parameters from the measured sonic data: First, a fast root finding mode-search routine can generate computed modal dispersions as a function of relevant cement parameters. Differences between the computed and measured modal dispersions are minimized by varying one or more of the relevant cement parameters. Estimated cement parameters are the ones that minimize differences below a threshold between the measured and computed dispersions over a chosen bandwidth. Second, differences between measured and calculated reference dispersions can be related to the cement parameters of interest in terms of a volume perturbation integral as a function of frequency to facilitate the inversion process. It is then straight-forward to solve this integral equation for the cement parameters of interest.

Figure 16:
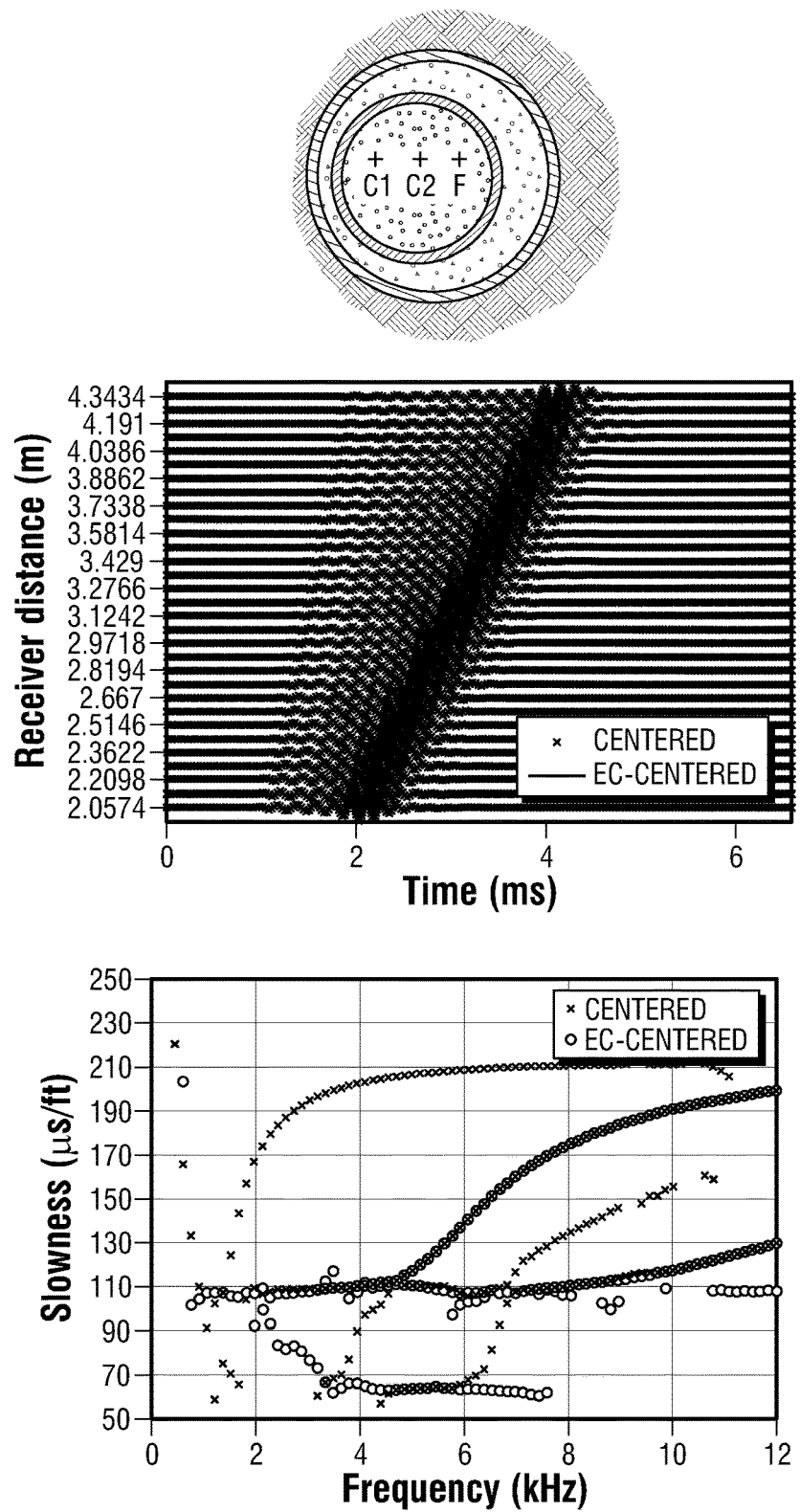
FIG. 16 is a series including a plot of a double casings case with both casings eccentered with respect to each other and to the borehole (upper panel), a plot of calculated sonic receiver array waveforms for two casing eccentering conditions (middle panel), and calculated sonic slowness dispersions (lower panel).

FIG. 16 shows an example of anticipated sonic results corresponding to a dipole excitation within a double string configuration. The inner and outer casing eccentered with respect to each other and both eccentered with respect to the borehole, as depicted in the sketch at the upper part of the figure. The receiver array signals, calculated with a finite difference code, are shown in the middle part of the figure, and compared to the case where both strings are centered with respect to each other and to the borehole. The corresponding slowness dispersion curves are shown in the lower dispersion plots for both eccentered and centered cases. The eccentered case shows additional attributes that are used to estimate casing eccentering. We find that these attributes are also sensitive to the properties of the material filling the space between the two casings and the outer casing and formation. Where cement fills these spaces, we also find they are sensitive to the bonding properties.

Inversion of Time-Lapse Data

When acoustic data from the multi-modality measurements described above are acquired at two or more than two instances during the lifetime of the well, the inversion will focus on the variations of the inversion parameters.

Degradation of cement annulus over certain years of use can be manifested in terms of changes in the cement elastic properties ($\Delta Vp (\phi,z)$, $\Delta Vs(\phi,z)$, and $\rho(\phi,z)$). For instance, time-lapse reduction in the compressional and shear velocities, together with mass density can be used as a proxy for impaired mechanical integrity of cement caused by the introduction of fractures and fluid channels in the cement annulus behind the casing.

Yet another source of degradation can be attributed to changes in the normal and tangential compliances at the second ($\Delta \eta_{N2}(\phi,z)$ and $\Delta \eta_{T2}(\phi,z)$) or third ($\Delta \eta_{N2}(\phi,z)$ and $\Delta \eta_{T2}(\phi,z)$) interfaces outside the casing that can be caused by the presence of dry or fluid-filled micro-annuli. Cement properties can also be expressed in terms of the bulk (K) and shear (μ) moduli that are related to the compressional and shear wave velocities as well as mass density: $\rho V_P^2 = K + 4\mu/3$; and $\rho V_S^2 = \mu$. Time-lapse estimates of cement properties and bond quality indicators can help to estimate the rate of degradation of cement elastic properties. Knowing the rate of decay of such properties can help to predict remaining cement life or longevity beyond which cement quality would be so degraded that zonal isolation would be compromised.

Figure 17:
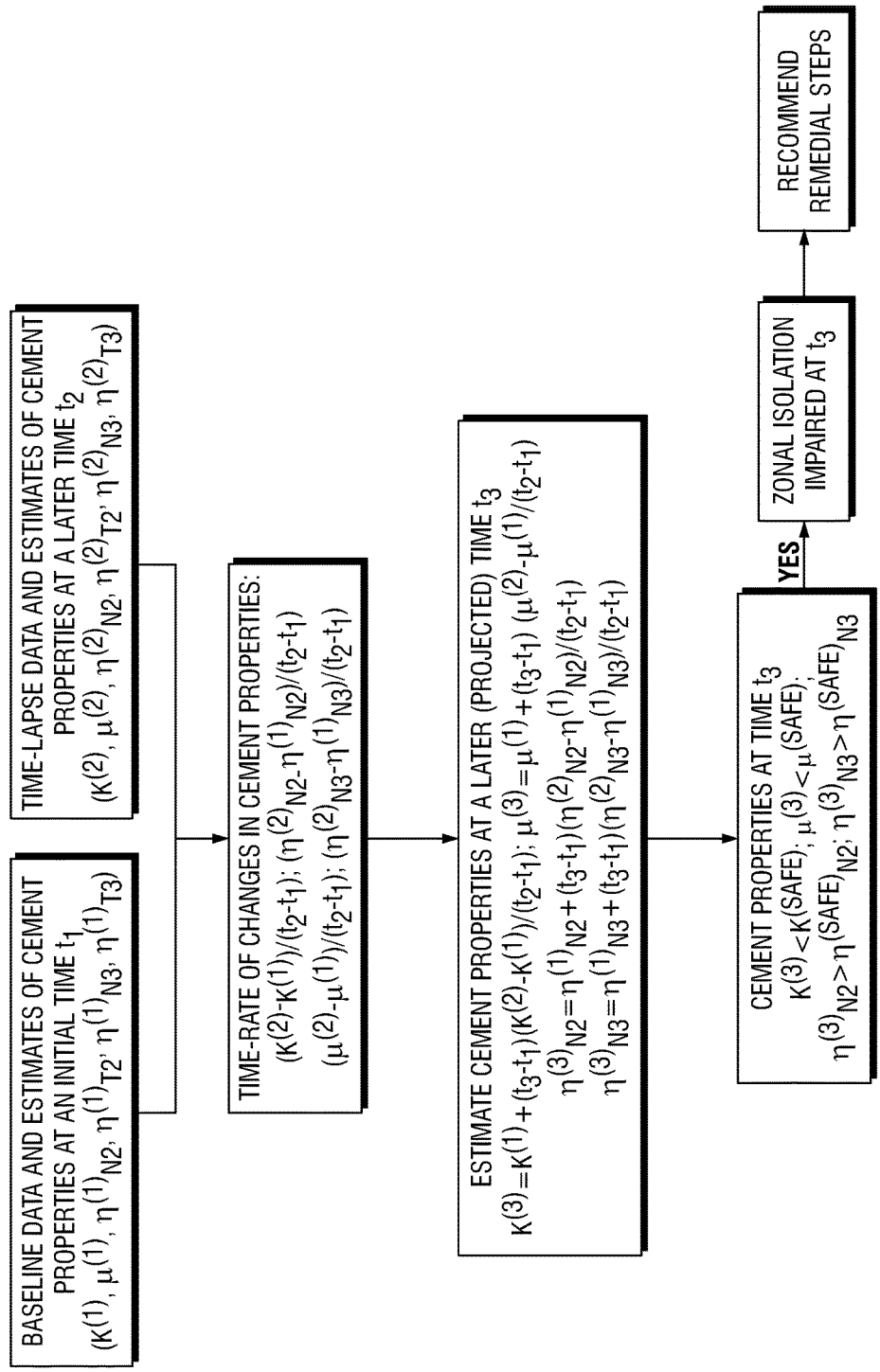
FIG. 17 is a workflow of an embodiment for predicting longevity of cement sheath for maintaining zonal isolation from an integrated inversion of time-lapse multi-modality data.

FIG. 17 shows a workflow for the prediction of longevity of cement sheath for maintaining zonal isolation by monitoring time-lapse changes in the cement bulk and shear moduli together with normal and tangential compliances at the second (casing/cement) or third (cement/formation) interfaces, as well as mass density. The superscript on the parameters denotes the time of measurement. For instance, $\eta^{(1)}_{N2}$ denotes normal compliance at time t1 at the $2^{nd}$ interface. Note that both the normal and tangential compliances are zero in the well-bonded configuration. Degradation of the zonal isolation can be monitored by an increase in the normal and tangential compliances at the second or third interfaces.

In the workflow in FIG. 17, a linear approximation is used to predict the evolution of the cement properties in account of the changes estimated in the parameters from the two measurements taken at t1 and t2. Less approximate, non-linear, relations could be used especially if more than two time-lapse measurements are taken. The extrapolation provides the approximate time in the future at which the cement parameters evolve to attain a level below a priori-estimated threshold level that would result in impaired sheath integrity and would compromise zonal isolation.

Well drilling consists of multiple steps whereby boreholes of decreasing diameters are drilled in sequence. As a specific depth section is drilled, it is cased and cemented, before the process proceeds with the drilling of the next deeper sections. During the tripping phases of the drilling string, measurements across the cased and cemented section can be performed with logging-while-drilling sonic and ultrasonic tools implemented in the drilling string. Multi-modality inversion as described herein is used to invert for the properties of barrier behind casing such as wavespeeds and bond parameters at the casing-cement and cement-formation interfaces.

The inverted parameters can be plotted to monitor their evolution with time.

Figure 18:
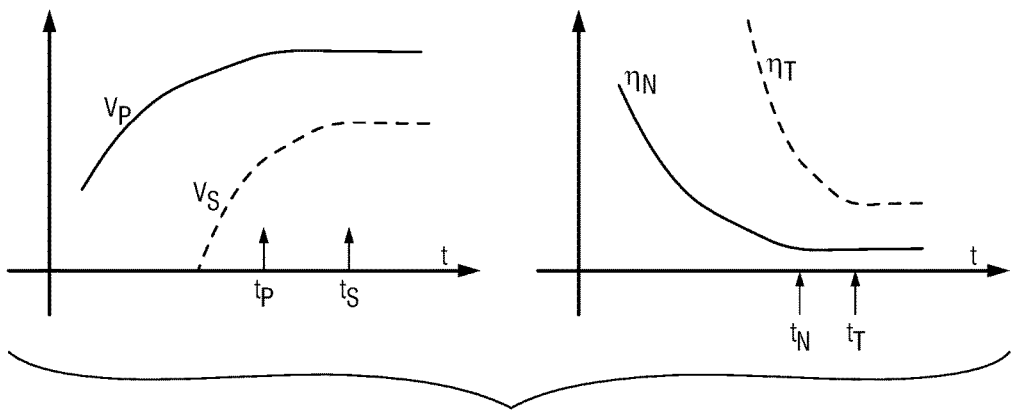
FIG. 18 is a series of plots of barrier wavespeeds and bond compliances as a function of time.
Figure 19:
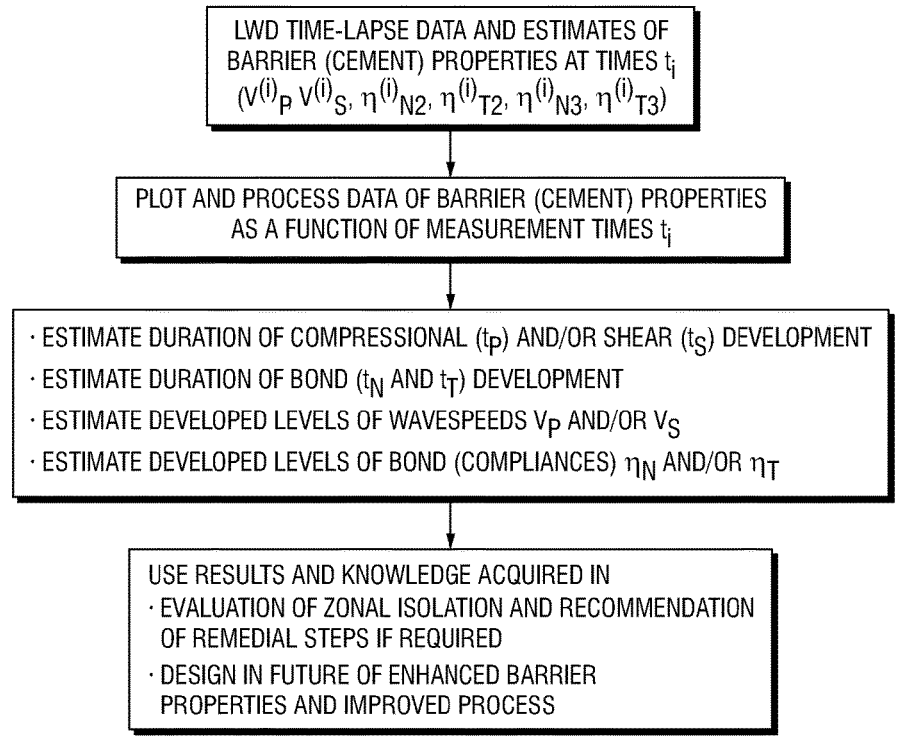
FIG. 19 is a workflow of an embodiment for predicting time evolution of the barrier wavespeed and bonding properties for multi-modality inversion of measurement data acquired at multiple times during drilling operations.

FIG. 18 shows plots depicting the expected evolution of these parameters with time. In particular, it is expected that the properties will settle at a certain level within specified times after the cementing process. These levels and their associated durations are critical parameters that can inform on the integrity of the barrier zonal isolation achieved as well as help improve the design of the barrier (cement) formulation and process for the next well section to be cased and cemented as well as for the future wells. FIG. 19 shows a workflow that conveys the steps related to this method. Note that in FIGS. 18 and 19, the bonding parameters without subscripts are to be understood as referring to the casing-cement and cement-formation interfaces.

Some embodiments may benefit from characterizing a barrier installed in a borehole traversing a formation including locating an acoustic tool with a receiver and a transmitter at a location in the borehole, activating the acoustic tool to form acoustic waveforms, wherein the receiver records the acoustic waveforms, and processing the waveforms to obtain to identify barrier parameters as a function of azimuth and depth along the borehole, wherein the waveforms comprise at least two of sonic signals, ultrasonic pulse-echo signals, and ultrasonic pitch-catch signals. In some embodiments, the barrier parameters are barrier wavespeeds, bond compliances at a casing-barrier and barrier-formation interface, indications of barrier abnormalities, and combinations thereof. In some embodiments, the processing comprises upscaling the barrier parameters obtained with ultrasonic data processing to a sonic spatial length. In some embodiments, the barrier parameters are used to identify regions along the borehole for additional well services. In some embodiments, the locating and activating occur during drilling. Some embodiments may benefit from repeating the locating, activating and processing to determine barrier changes over time.

Some embodiments may benefit from characterizing a barrier installed in a borehole traversing a formation including locating an acoustic tool of a high-frequency content in the range of 80 kHz and above with a receiver and a transmitter at a location in the borehole, activating the acoustic tool to form acoustic waveforms, wherein the receiver records the acoustic waveforms and wherein the waveforms comprise pulse-echo signals and pitch-catch signals, and processing the waveforms to obtain initial barrier parameters as a function of azimuth and depth along the well. In some embodiments, the barrier parameters are comprised of barrier wavespeeds, bond compliances at a casing-barrier and barrier-formation interface, and indications of barrier abnormalities, and combinations thereof. Some embodiments may benefit from comparing the initial cement parameters using a measurement simulator and updating the initial cement parameters. In some embodiments, the processing comprises full waveform inversion or attributes-based inversion or both. In some embodiments, the measurement simulator comprises casing parameters, mud parameters, wellbore geometry and tool parameters.

Some embodiments benefit from characterizing multiple barriers in multiple casing strings installed in a borehole traversing a formation including locating a sonic tool at a location in the borehole, activating the sonic tool to generate waveforms, recording waveforms at an array of receivers, processing these waveforms to obtain dispersions associated with the propagating modes and measured sonic resonant frequencies associated with the non-propagating modes, calculating reference dispersions and resonant frequencies, calculating differences between the measured and reference dispersions, comparing the measured and reference dispersions and updating cement parameters not inverted from the ultrasonic data and repeating the comparing, and characterizing mechanical integrity of the barriers in the multiple casing strings. In some embodiments, the sonic tool comprises a monopole transmitter, dipole transmitter, quadrupole transmitter or a combination thereof. In some embodiments, the sonic tool generates waveforms that are monopole, dipole, quadrupole or a combination thereof. In some embodiments, the calculating comprises multiple casing strings with multiple barriers using parameters for cement barrier and bond quality estimated from the ultrasonic data together with input parameters for hole geometry and mud properties. In some embodiments, the cement parameters not inverted from the ultrasonic data comprise Vp2, Vs2, $\eta_{N2}$, $\eta_{T2}$, $\eta_{N3}$, $\eta_{T3}$ and combinations thereof. Some embodiments benefit from outputting a complete suite of cement parameters comprising Vp1, Vs1, $\eta_{N2}$, $\eta_{T2}$, $\eta_{N3}$, $\eta_{T3}$, Vp2, Vs2, and combinations thereof.

Some embodiments benefit from monitoring changes in a barrier installed in a borehole traversing a formation including measuring data to calculate cement elastic properties and interfacial bond properties at an initial time and subsequent time, comparing elastic properties and interfacial bond properties obtained at the initial and subsequent times, calculating differences in these elastic and bond properties at multiple times, calculating time-dependent rate of decay of elastic and bond properties, calculating additional time needed for elastic and bond properties to degrade below an acceptable threshold resulting in impaired sheath integrity that would compromise zonal isolation.

Some embodiments may benefit from monitoring the strength of a barrier installed in a borehole traversing a formation including collecting sonic and ultrasonic data across cased sections during logging while drilling, calculating and plotting cement elastic properties and interfacial bond properties at an initial time and subsequent multiple times, calculating shear or compressional velocities, normal and tangential compliances at different times, estimating times tP and tS for the wavespeeds VP and VS to attain nearly steady-state values, estimating times tN and tT for the normal and tangential compliances $\eta N$ and $\eta T$ to attain nearly steady-state values, determining the time required to provide the necessary barrier strength for a successful completion of the well with adequate barrier strength for zonal isolation, and applying the lessons learned to design enhanced cement formulations and perform better cement jobs to ensure durable zonal isolation, efficiently and cost-effectively in the future wells.

We claim:

1. A method for characterizing a physical barrier comprising a plurality of casings and a plurality of annular fills installed in a borehole traversing a formation, the method comprising:

locating an acoustic tool with at least one receiver and at least one transmitter at a location in the borehole, wherein the acoustic tool is configured to perform at least two of (i) sonic measurements, (ii) ultrasonic pulse-echo measurements, and (iii) ultrasonic pitch-catch measurements of the physical barrier;

using the at least one transmitter of the acoustic tool, generating at least two types of acoustic waveforms that interact with the plurality of casings and the plurality of annular fills of the physical barrier, wherein the at least two types of acoustic waveforms comprise at least two of (i) sonic waveforms, (ii) ultrasonic pulse echo waveforms, wherein the at least one transmitter is oriented normal to the physical barrier, and (iii) ultrasonic pitch-catch waveforms, wherein the at least one transmitter is oriented at one or more angles to excite at least one mode within the physical barrier;

using the at least one receiver of the acoustic tool, recording resulting waveforms that result from the interaction of the at least two types of acoustic waveforms with the plurality of casings and the plurality of annular fills of the physical barrier to obtain at least two types of acoustic waveform data, wherein the at least two types of acoustic waveform data comprise at least two of (i) sonic waveform data, (ii) ultrasonic pulse-echo waveform data, and (iii) ultrasonic pitch-catch waveform data; and processing the at least two types of acoustic waveform data using an inversion to determine barrier parameters as a function of azimuth and depth along the borehole.

2. The method of claim 1, wherein the annular fill comprises cement.

3. The method of claim 2, wherein the barrier comprises surfaces between the formation and the cement.

4. The method of claim 1, wherein the barrier parameters comprise at least one of (i) barrier wavespeeds, (ii) bond compliance at a casing-cement interface, (iii) bond compliance at a cement-formation interface, (iv) indications of barrier abnormalities, and (v) combinations thereof.

5. The method of claim 1, wherein the processing comprises upscaling the barrier parameters obtained with ultrasonic data processing to a sonic spatial length.

6. The method of claim 1, wherein the at least one receiver comprises multiple receivers.

7. The method of claim 1, wherein the at least one transmitter comprises multiple transmitters.

8. The method of claim 1, wherein the barrier parameters are used to identify regions along the borehole for performing additional well services.

9. The method of claim 1, wherein the locating, the activating, and the recording occur during a borehole drilling operation.

10. The method of claim 1, further comprising repeating the locating, the activating, the recording, and the processing to determine barrier changes over time.

11. A method for characterizing a physical barrier comprising a plurality of casings and at least one annular fill installed in a borehole traversing a formation, the method comprising:

locating an acoustic tool comprising at least one transmitter and at least one receiver at a location in the borehole, wherein the acoustic tool is configured to perform pulse-echo measurements and pitch-catch measurements of the physical barrier;

using the at least one transmitter of the acoustic tool, generating (i) pulse-echo waveforms that interact with the physical barrier and that have a frequency of at least 80 kHz, wherein the at least one transmitter is oriented normal to the physical barrier and (ii) pitch-catch waveforms that interact with the barrier and that have a frequency of at least 80 kHz, wherein the at least one transmitter is oriented at one or more angles to excite at least one mode within the physical barrier;

using the at least one receiver, recording resulting pulse-echo waveforms that result from the interaction of the pulse-echo waveforms with the physical barrier and resulting pitch-catch waveforms that result from the interaction of the pitch-catch waveforms with the physical barrier to obtain pulse-echo waveform data and pitch-catch waveform data; and processing the pulse-echo waveform data and the pitch-catch waveform data using an inversion to obtain barrier parameters as a function of azimuth and depth along the borehole.

12. The method of claim 11, wherein the barrier parameters comprise at least one of (i) barrier wavespeeds, (ii) bond compliance at a casing-cement interface, (iii) bond compliance at a cement-formation interface, (iv) indications of barrier abnormalities, and (v) combinations thereof.

13. The method of claim 11, wherein the processing further comprises:

processing the pulse-echo waveform data and pitch-catch waveform data using the inversion to obtain initial barrier parameters;

generating a reference waveform using a measurement simulator and the initial barrier parameters;

comparing at least one of the two types of waveforms and the generated waveform; and updating the initial barrier parameters based on the comparison.

14. The method of claim 11, wherein the inversion comprises full waveform inversion, attributes-based inversion, or both.

15. The method of claim 13, wherein the measurement simulator uses casing parameters, mud parameters, wellbore geometry and tool parameters to generate the generated waveform.

16. A method for characterizing a physical barrier comprising multiple casings and multiple annular fills installed in a borehole traversing a formation, the method comprising:

locating a sonic tool at a location in the borehole, wherein the sonic tool comprises a transmitter and an array of receivers;

using the transmitter of the sonic tool, generating sonic waveforms that interact with the physical barrier;

using the array of receivers, recording resulting waveforms that result from the interaction of the sonic waveforms and the physical barrier to obtain sonic waveform data;

processing the sonic waveform data to obtain measured dispersions;

calculating reference dispersions using barrier parameters obtained from inverting ultrasonic data obtained from ultrasonic measurements of the barrier;

comparing the measured dispersions and reference dispersions;

updating the barrier parameters that were not obtained from inverting ultrasonic data obtained from ultrasonic measurements of the physical barrier;

repeating the calculating, comparing, and updating to minimize differences between the measured dispersions and the reference dispersions; and characterizing mechanical integrity of the physical barrier using the barrier parameters.

17. The method of claim 16, wherein the transmitter of the sonic tool comprises a monopole transmitter, dipole transmitter, quadrupole transmitter, or a combination thereof.

18. The method of claim 16, wherein the transmitter of the sonic tool generates waveforms that are monopole, dipole, quadrupole, or a combination thereof.

19. The method of claim 16, wherein the calculating the reference dispersions comprises calculating reference dispersions for a barrier that includes multiple casings and multiple annular fills using (i) casing parameters, (ii) mud parameters, (iii) hole geometry, (iv) cement parameters obtained from inverting ultrasonic data obtained from ultrasonic measurements of the barrier, and (v) bond parameters obtained from inverting ultrasonic data obtained from ultrasonic measurements of the barrier.

20. The method of claim 16, wherein the barrier parameters that were not obtained from inverting ultrasonic data obtained from ultrasonic measurements of the barrier comprise at least one of compressional wavespeed at a casing-cement interface ($V_{p2}$), shear wavespeed at a casing-cement interface ($V_{s2}$), normal compliance at a casing-cement interface ($\eta_{N2}$), tangential compliance at a casing-cement interface ($\eta_{T2}$), normal compliance at a cement formation interface ($\eta_{N3}$), tangential compliance at a cement-formation interface ($\eta_{T3}$), and combinations thereof.

21. The method of claim 16, wherein the characterizing comprises outputting barrier parameters comprising compressional cement wavespeed obtained from inverting ultrasonic data ($V_{p1}$), shear cement wavespeed obtained from inverting ultrasonic data ($V_{s1}$), compressional wavespeed at a casing-cement interface ($V_{p2}$), shear wavespeed at a casing cement interface ($V_{s2}$), normal compliance at a casing-cement interface ($\eta_{N2}$), tangential compliance at a casing-cement interface ($\eta_{T2}$), normal compliance at a cement-formation interface ($\eta_{N3}$), tangential compliance at a cement-formation interface ($\eta_{T3}$), and combinations thereof.

22. A method for monitoring changes in a physical barrier wherein the physical barrier comprises a plurality of casings and at least one annulus filled with cement installed in a borehole traversing a formation, the method comprising:

performing acoustic measurements on the physical barrier by generating acoustic waveforms using an acoustic transmitter that interact with the physical barrier and recording the resulting acoustic waveforms which result from the interaction of the acoustic waveforms with the physical barrier using an acoustic receiver to obtain acoustic data at an initial time and a subsequent time, wherein the acoustic waveforms generated by the acoustic transmitter include one or more of ultrasonic pulse-echo waveforms and ultrasonic pitch-catch waveforms, wherein the ultrasonic transmitter is oriented at an angle to excite at least one mode within the physical barrier when generating ultrasonic pitch-catch waveforms and is oriented normal to the physical barrier when generating ultrasonic pulse-echo waveforms;

calculating cement elastic properties and interfacial bond properties at the initial time and the subsequent time;

comparing elastic properties and interfacial bond properties obtained at the initial time and subsequent time;

calculating differences in the elastic properties and interfacial bond properties obtained at the initial time and subsequent time;

calculating time-dependent rate of decay of elastic and bond properties using the differences; and calculating time-for elastic and bond properties to degrade below an acceptable threshold resulting in impaired barrier sheath integrity that would compromise zonal isolation.

23. A method for monitoring strength of a physical barrier installed in a borehole traversing a formation, the method comprising:

performing a drilling operation and performing sonic and ultrasonic measurements on the physical barrier at a plurality of measurement times while the drilling operation is performed by generating, with a sonic transmitter and an ultrasonic transmitter, sonic and one or more of ultrasonic pulse-echo waveforms and ultrasonic pitch-catch waveforms that respectively interact with the physical barrier, and recording, using at least one sonic receiver and at least one ultrasonic receiver the resulting sonic and ultrasonic waveforms which respectively result from the interaction of the sonic and ultrasonic waveforms with the physical barrier, to obtain sonic and ultrasonic data, wherein the ultrasonic transmitter is oriented at an angle to excite at least one mode within the physical barrier when generating ultrasonic pitch-catch waveforms and is oriented normal to the physical barrier when generating ultrasonic pulse-echo waveforms;

calculating a plurality of barrier properties as a function of measurement time using the sonic and ultrasonic data;

estimating times for the plurality of barrier properties to attain nearly steady-state values; and determining time required to provide necessary barrier strength for a successful completion of the borehole with adequate barrier strength for zonal isolation using the times for the plurality of barrier properties to attain nearly steady-state values.

24. The method of claim 23, wherein the plurality of barrier properties comprises at least one of (i) compressional wavespeed of the barrier as a function of measurement time, (ii) shear wavespeed of the barrier as a function of measurement time, (iii) normal compliance of the barrier as a function of measurement time, and (iv) tangential compliance of the barrier as function of time.

* * * * *